(12) United States Patent
Feliss et al.

(10) Patent No.: US 7,538,973 B2
(45) Date of Patent: May 26, 2009

(54) METHOD AND APPARATUS FOR PROVIDING A FLUID DAMPING STRUCTURE WITH FUEL CELL FOR A HARD DISK DRIVE AND VIBRATION SENSITIVE ELECTRONIC DEVICES

(75) Inventors: Norbert A. Feliss, Sunnyvale, CA (US); Karl A. Flechsig, Los Gatos, CA (US); Donald R. Gillis, San Jose, CA (US); Sylvia L. Lee, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 481 days.

(21) Appl. No.: 11/388,277

(22) Filed: Mar. 24, 2006

(65) Prior Publication Data

US 2007/0223138 A1    Sep. 27, 2007

(51) Int. Cl.
*G11B 33/14*    (2006.01)
(52) U.S. Cl. .................................... 360/97.02
(58) Field of Classification Search ........................ None
See application file for complete search history.

(56) References Cited

U.S. PATENT DOCUMENTS

| | | | |
|---|---|---|---|
| 5,837,934 A | 11/1998 | Valavanis et al. | 174/544 |
| 5,995,365 A | 11/1999 | Broder et al. | 361/685 |
| 6,283,438 B1 | 9/2001 | Shimada et al. | 248/694 |
| 6,289,678 B1 | 9/2001 | Pandolfi | 62/3.2 |
| 6,477,043 B2 * | 11/2002 | McKnight | 361/685 |
| 6,489,745 B1 | 12/2002 | Koreis | 320/108 |
| 6,532,152 B1 | 3/2003 | White et al. | 361/692 |
| 6,560,107 B1 | 5/2003 | Beck et al. | 361/699 |
| 6,567,262 B2 | 5/2003 | Meir | 361/676 |
| 6,717,801 B1 | 4/2004 | Castell et al. | 361/683 |
| 7,035,031 B2 | 4/2006 | Kim et al. | 360/69 |
| 2002/0043608 A1 | 4/2002 | Nakata et al. | 248/560 |
| 2003/0007274 A1 | 1/2003 | Fajardo | 360/55 |
| 2003/0048254 A1 | 3/2003 | Huang | 345/163 |
| 2003/0048607 A1 | 3/2003 | Ives et al. | 361/695 |
| 2003/0074529 A1 | 4/2003 | Crohas | 711/115 |
| 2003/0099055 A1 | 5/2003 | Kim et al. | 360/69 |
| 2003/0157960 A1 | 8/2003 | Kennedy | 455/556 |
| 2003/0210519 A1 | 11/2003 | Wubs | 361/685 |
| 2003/0224824 A1 | 12/2003 | Hanson | 455/560 |
| 2004/0003282 A1 | 1/2004 | Smith | 713/200 |

(Continued)

OTHER PUBLICATIONS

Ed Frauenheim, "Maxtor, Linksys to Unveil Wireless Hard Drive," Sep, 30, 2004, www.CNETNews.com, 2 pages.

(Continued)

*Primary Examiner*—David D Davis
(74) *Attorney, Agent, or Firm*—Merchant & Gould

(57) ABSTRACT

A shock and vibration resistant hard disk drive has a plurality of fluid damping isolation devices disposed between the drive and a supporting frame. The isolation devices are capsules containing either gasses or liquids enclosed in a flexible membrane that spring back to its original shape after the shock or vibration event has transpired. Variation of fluid properties such as density, viscosity, and pressure allow for custom tuning of the vibration and shock performance. In addition, variation of membrane chemistry and thickness of the membrane also allows for further customization. A fuel cell is provided and the isolation devices may provide the energy source for the fuel cell.

20 Claims, 12 Drawing Sheets

U.S. PATENT DOCUMENTS

| | | | | |
|---|---|---|---|---|
| 2004/0046803 | A1 | 3/2004 | James | 345/810 |
| 2004/0095670 | A1* | 5/2004 | Boljanovic | 360/75 |
| 2004/0127254 | A1 | 7/2004 | Chang | 455/557 |
| 2006/0072241 | A1 | 4/2006 | Feliss et al. | 360/97.02 |

OTHER PUBLICATIONS

"GoBook II—shock mounted hard drive with optional heater," Sep. 30, 2004, www.itronix.com, 2 pages.

"Ultralow Power 24-Bit Seismic Field Data Recorder, Model DR4000," Sep. 30, 2004, www.sprengnether.com/DR-4000, 2 pages.

Petter Lunde, "Heated Hard Disk Drives," www.cc-technology.com, Sep. 30, 2004, 1 page.

"MP5/M-PC Computers p. 1 cold startup with disk heater," www.embedded-pc.microbus.com/products/systems, Sep. 30, 2004, 3 pages.

Dominic Casciani, "Black box: Key to Investigations," www.news.bc.co.uk/hi/sci/tech/503000.stm, Sep. 30, 2004, 4 pages.

"Transponder-fitted crash box for hard disk," www.iasa.com.au/folders/safety_issues/others, 4 pages, Jun. 27, 2002.

Apr. 1, 2003, Brain, Marshall, "How Hard Disks Work," www.howstuffworks.com, pp. 1-4.

1997, Zeng et al., "A Modal Analysis Method for Slider-Air Bearings in Hard Disk Drives," AR-09, IEEE.

* cited by examiner

METHOD AND APPARATUS FOR PROVIDING A FLUID DAMPING STRUCTURE WITH FUEL CELL FOR A HARD DISK DRIVE AND VIBRATION SENSITIVE ELECTRONIC DEVICES

CROSS-REFERENCE TO RELATED APPLICATION

This application is related to the following co-pending and commonly-assigned U.S. Patent Application, which is hereby incorporated herein by reference in their respective entirety:

"SYSTEM, METHOD, AND APPARATUS FOR A WIRELESS HARD DISK DRIVE" to Feliss et al., Filed Sep. 30, 2004, having U.S. patent application Ser. No. 10/955,404.

BACKGROUND OF THE INVENTION

1. Field of the Invention

The present invention relates to vibration and mechanical shock protection of electronic devices, and more specifically, to a method and apparatus for providing a fluid damping structure with fuel cell for a hard disk drive or other sensitive electronic device used in high vibration and shock environments.

2. Description of Related Art

The increasing popularity and computing performance of portable electronic devices such as cell phones, MP3 players, global positioning units, PDAs and portable computers, coupled with the miniaturization and increased storage density of hard disk drives, has migrated demand for the hard disk drive into these portable devices. However, the hard disk drive was never designed to be used in high vibration or high impact and shock environments. Redesigning the hard drives to meet such requirements would increase costs and reduce demand for many portable, cost sensitive applications such as cell phones and MP3 players. It would be useful to have a packaging system that would isolate currently designed drives from shock and vibration to enable such drives to be used in portable devices.

Shock-absorbing materials can be made from a mixture of solid particles and viscous elastic material and arranged at the periphery of an information storage and retrieval device. When an external shock is applied to the device, the shock-absorbing material is greatly deformed and dissipates the shock energy by inner friction sufficiently to prevent damage to the inner mechanism of the device. The deformed shock-absorbing material can be restored to the original shape so that it is repeatedly usable. However, the shock absorbing material disclosed in the aforementioned references requires that the storage device be manually repositioned to its original position after impact. This is impractical in most potable device applications because users usually do not open their cell phones or MP3 players after they are shocked or dropped, due to the difficulty of opening such miniature devices. Often, the manufacturer discourages such action by voiding warranties. The shock absorbing materials are complex solids containing a wide variety of components including sand, springs, complex webs, and cloth contained within a solid viscous elastic material. These materials may be expensive to manufacture, increasing the potential cost of the hard drives and reducing the desirability for their use in mass-produced portable applications. Additionally, it is unclear as to whether the disclosed structures are effective for isolating vibration, which may be just as destructive to the hard drive if present over prolonged period of time.

In addition, cushioning devices may be placed at the four corners of a hard disk drive to suspend the drive within an external frame. Such cushioning devices may be composed of various types or rubber or solid viscous elastic material such as silicone gels. However, the area supported by the cushioning devices is limited, which may create compromises between shock protection and vibration isolation. Thus, a stiffer material that can transmit more vibration is required to protect effectively against shock loads with cushioning devices having a small contact area.

In addition to the problem of overcoming shock issue with portable electronic devices such as disk drives, power supplies of one sort or another are ubiquitous in such devices. Perhaps the best-known portable power supplies are batteries, of which there are many types and kinds. Batteries are very versatile power supplies in that they are typically able to power several times their optimum load for short periods of time. Indeed, the average lifespan of a battery is largely dependent upon the duration of its use, in combination with the size of the load applied thereto. Rechargeable batteries are also known, and they differ only slightly from conventional non-rechargeable batteries in that they may be periodically re-energized via external sources.

Despite their inherent versatility, batteries (both primary batteries, as well as rechargeable batteries) have a limited lifetime and usefulness, and must be replaced or recharged periodically. Thus, operators of high-load electronic equipment often carry several back-up batteries to address the extended operation of their equipment.

Fuel cells are also known power supplies, and are able to produce electrical power from the interaction of a fuel stream, typically consisting of hydrogen gas or the like, and an oxidant stream that contains oxygen. Other types of fuel cells, utilizing different fuel and oxidant streams, are also known.

In the past, practical applications for fuel cells have largely focused on large-scale uses such as stand-by power systems, and automobiles. This is due to the volumetric inefficiencies of fuel cell power plants, which are typically large in size. Thus, fuel cells are not currently considered as viable power supplies for wide-scaled application for small-scale electronic devices and appliances. Yet, companies are making large investments into fuel cell for this very reason.

Fuel cells are typically designed within demanding parameters. That is, fuel cells are designed to address specific size, weight and performance criteria. In contrast with batteries, fuel cells have typically been designed to provide power only marginally above their nominal level, and then for only short durations. If asked to exceed their nominal power output, fuel cells exhibit the characteristic of constant power supplies in that they will typically reduce their voltage output in accordance with Watt's law, addressing a higher current demand by supplying a corresponding lower voltage until such a time that the voltage is no longer capable of powering the load/electronic device.

In spite of the limitations discussed above, there is conceivably a wide range of products that would benefit from the use of fuel cells as a power supply. For example, in those applications where the electrical device is operated for extended periods of time away from a landed AC power source, it is often necessary to carry large amounts, and differing kinds, of batteries and/or associated recharging devices. One benefit of fuel cells, despite their volumetric inefficiency, is that the fuel itself (apart from its converter apparatus) can be carried in relatively smaller and lighter containers versus carrying the equivalent power in batteries.

Direct methanol fuel cells have become extremely promising as a power source for use in portable electric and electronic appliances. Direct methanol fuel cells generate power from methanol by removing protons directly from the methanol. This operates without using liquid acid or a reformer, and has many benefits including a bio-renewable fuel source, and virtually no undesired pollutants as output. One of the applications of such a fuel cell is for use in powering portable electronic equipment, such as laptop computers and cellular telephones and the like.

However, the fuel cells require a source of energy. For example, in a direct methanol fuel cell, methanol is typically supplied in cartridges, which could be inserted into the electronic device, and used to power the electronic device. When the cartridge is empty, the cartridge is replaced with a new cartridge, typically a cartridge that is readily available. In this way, the user can use the cartridges in place of batteries. However, a Is cartridge contributes additional weight to the portable devices.

It can be seen then that there is a need for a method and apparatus for providing a fluid damping structure with a fuel cell for a hard disk drive or other sensitive electronic device used in high vibration and shock environments.

SUMMARY OF THE INVENTION

To overcome the limitations in the prior art described above, and to overcome other limitations that will become apparent upon reading and understanding the present specification, the present invention discloses a method and apparatus for providing a fluid damping structure with fuel cell for a hard disk drive or other sensitive electronic device used in high vibration and shock environments The present invention solves the above-described problems by providing a fuel cell and shock absorbing mechanism, wherein the energy source for the fuel cell is provided by the shock absorbing mechanism.

A shock resistant information storage and retrieval device in accordance with the principles of the present invention includes a frame enclosing said hard disk drive, a plurality of isolation devices disposed between at least one inner surface of said frame and at least one opposing outer surface of said hard disk drive and a fuel cell, coupled to the hard disk drive and at least one of the plurality of isolation devices, wherein said plurality of isolation devices comprise a fluid contained within a flexible membrane to provide shock absorption to the disk drive within the frame and to provide fuel for powering the fuel cell.

In another embodiment of the present invention, a shock absorbing power device is provided. The shock absorbing power device includes a plurality of isolation devices and a fuel cell, coupled to at least one of the plurality of isolation devices, wherein said plurality of isolation devices comprise a fluid contained within a flexible membrane to provide shock absorption and to provide fuel for powering the fuel cell.

In another embodiment of the present invention, a method for providing a fluid damping structure with a fuel cell is provided. The method includes providing a disk drive, at least partially encasing the disk drive between shock absorbing membranes providing fuel cell for powering the disk drive and supplying the fuel cell with an energy source stored in the shock absorbing membranes.

These and various other advantages and features of novelty which characterize the invention are pointed out with particularity to the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, method, and apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustrating the specific embodiments in which the invention may be practiced. It is to be understood that other embodiments may be utilized as structural changes may be made without departing from the scope of the present invention.

The present invention provides a method and apparatus for providing a fluid damping structure with fuel cell for a hard disk drive or other sensitive electronic device used in high vibration and shock environments. According to an embodiment of the present invention, a fuel cell and shock absorbing mechanism are combined, wherein the energy source for the fuel cell is provided by the shock absorbing mechanism.

Figure 1:
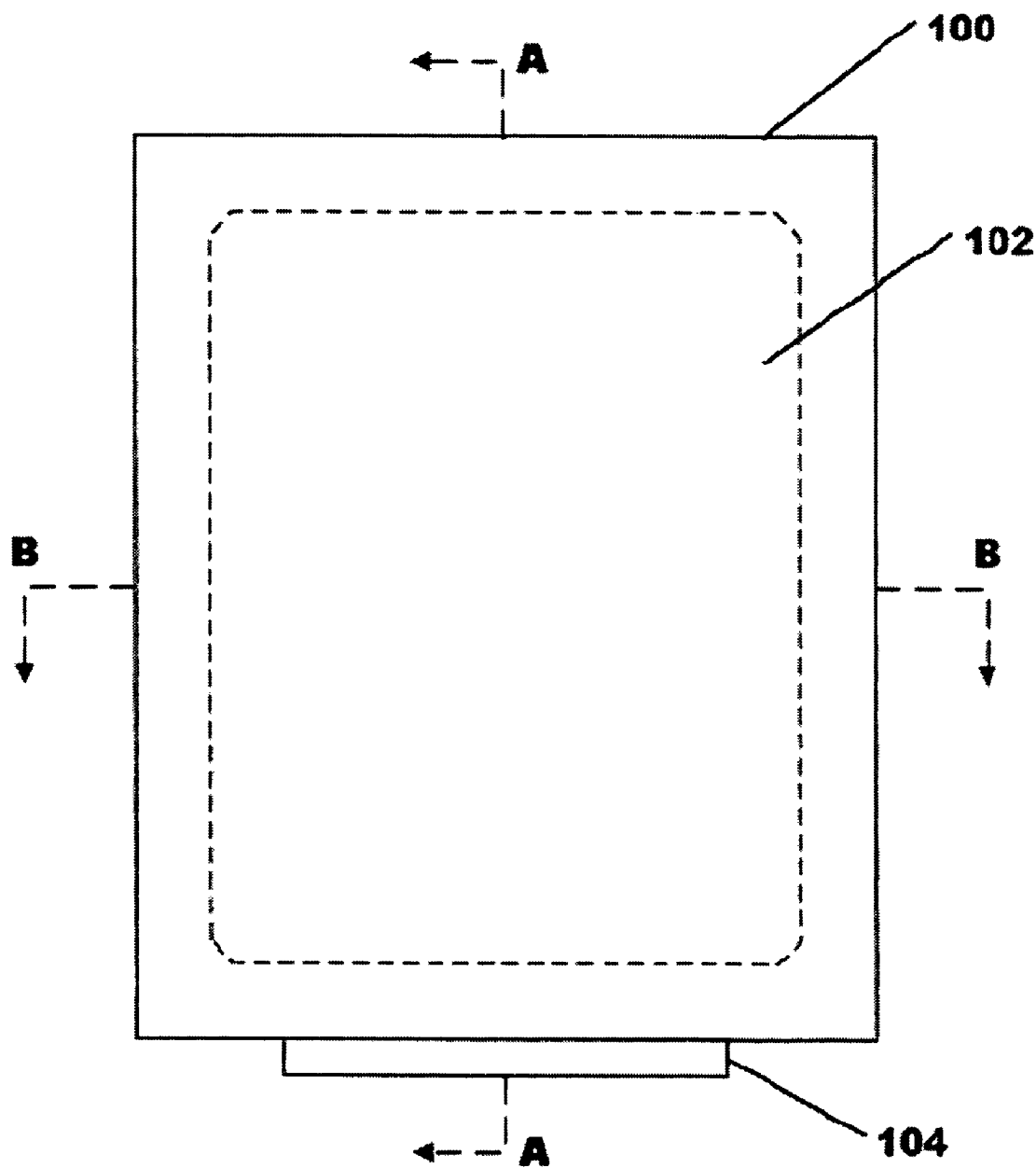
FIG. 1 is a top view of a shock and vibration isolation frame according to an embodiment of the present invention.

FIG. 1 is a top view of a shock and vibration isolation frame 100 according to an embodiment of the present invention. Contained within the frame 100 is a packaged electronic device 102 for which shock and vibration isolation is desired. Electrical connections with device 102 are made through connector 104. Device 102 can be any electronic device, but is preferably a device containing moving or rotating parts such as hard disk drives, CD players, or DVD players, for example. Predominantly, the invention is applied to protect hard disk drives, but as any practitioner skilled in the art will appreciate, other devices such as those mentioned are equally suitable. Frame 100 is a rigid structure that completely encompasses hard drive device 102, and provides for interconnectivity with outside circuit devices via connector 104. For simplicity, frame 100 is shown as a single component, but it may also be composed of sections that are fastened together using methods well known to those skilled in the art. Cross-section views though sections A-A and B-B are presented in FIGS. 3 and 4 below.

Figure 2:
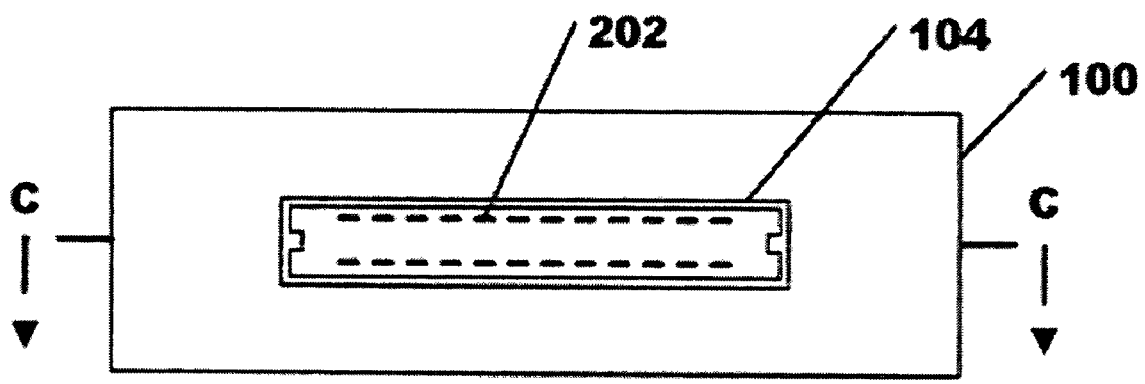
FIG. 2 is a front-end view of a shock and vibration isolation frame according to an embodiment of the present invention.

FIG. 2 is a front-end view of a shock and vibration isolation frame 100 according to an embodiment of the present invention. Connector 104 contains circuit pins 202 for making the desired electrical connections. The number, spacing, and layout of the connector 104 and pins 202 is usually standardized and is well known to those skilled in the art. Cross section view through section C-C is presented in FIG. 5 below.

Figure 3:
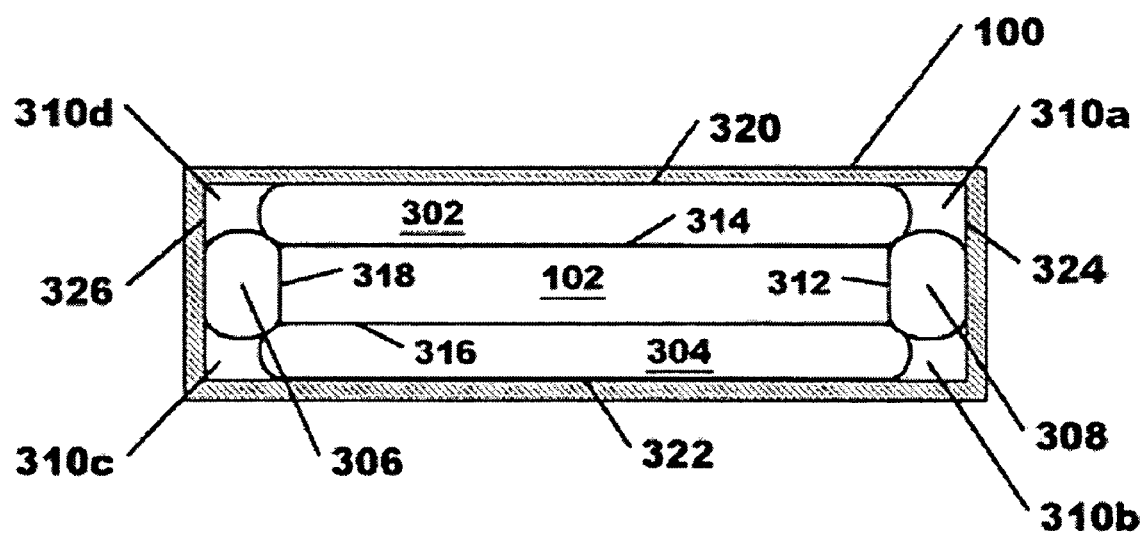
FIG. 3 is a cross section view through section B-B of FIG. 1 according to an embodiment of the present invention.

FIG. 3 is a cross section view through section B-B of FIG. 1 according to an embodiment of the present invention. This and following figures illustrate the vibration and shock isolation frame 100 as applied to hard disk drives. Minor variations in the layout and design of frame 100 would be required for removable media devices such as CD-ROMs or DVD players to allow media access, as can be appreciated by those skilled in the art. Hard disk drive 102 is suspended within the interior of frame 100 by isolation devices 302, 304, 306 and 308. Frame 100 may be, for example, a box or structure that is generally rigid and encloses a volume sufficient to contain hard disk drive 102 and the isolation devices. Frame 100 is preferably made of metal, but may also be constructed of rigid plastics of sufficient impact resistance. Isolation devices 302 and 304 are in contact with and cover the majority of top and bottom surfaces 314 and 36 of hard drive 102, respectively. Isolation device 302 is also in contact with top, inner surface 320 of frame 100. Isolation device 304 is also in contact with bottom, inner surface 322 of frame 100. Isolation devices 308 and 306 are in contact with left and right side surfaces of hard disk drive 102, respectively. Isolation device 306 is also in contact with right, inner surface 326 of frame 100. Isolation device 308 is also in contact with left, inner surface 324 of frame 100. Isolation devices 302-308 are, for example, fluid filled balloons or capsules. A thin, elastic membrane or film contains the fluid. As used in this specification, a fluid can be a liquid or gas. It is to be distinguished from a viscous elastic gel of the prior art in that the viscous elastic gels are solids. These gel solids retain their shape without the need of a confining container. Fluids are more desirable than viscous gels because fluid properties such as density and viscosity can be varied over 5 orders of magnitude, allowing tuning of the system to match anticipated vibration and shock environments. Liquids may be more suitable than gasses for hard drives that generate a lot of heat that must be dissipated. Gasses may be more suitable than liquids for cold environments that require heat be retained within the drive for proper operation. Areas 310*a-d* are desired to accommodate possible expansion of the isolation devices 302-308, which may occur under compressive loads created by the movement of device 102 in response to a shock force. For isolation devices containing a gas, areas 310*a-d* can be minimized or eliminated due to the compressibility of a gas. However, if the isolation devices contain a liquid, expansion areas 310 are desirable to maximize the deflection of the disk drive 102 under a shock load. Optionally, isolation devices 302-308 may be glued or attached to corresponding surfaces of frame 100, hard drive 102, or both. This may be desirable for isolation devices containing liquids, to increase the damping factor.

Figure 4:
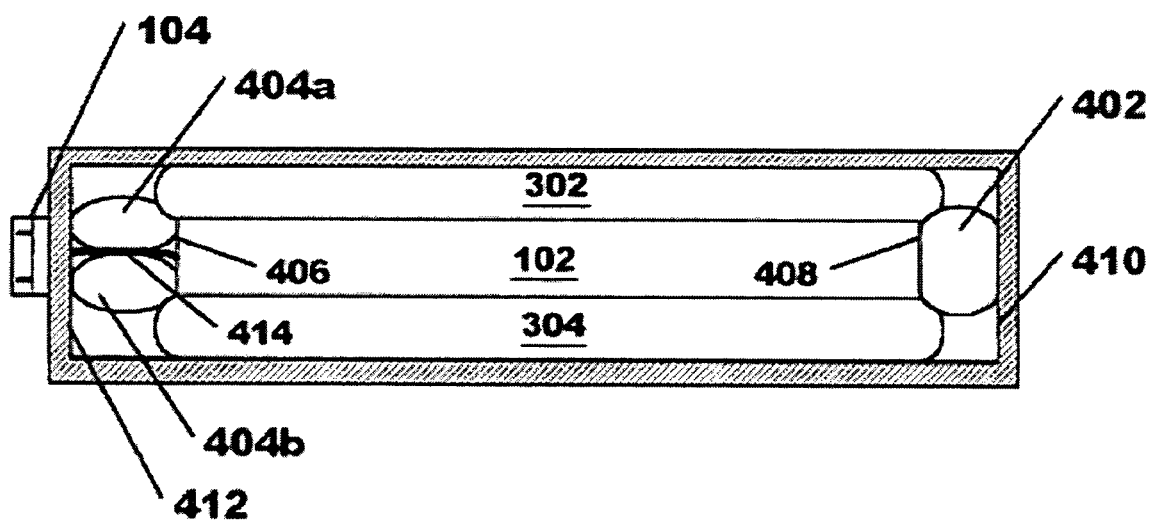
FIG. 4 is a cross section view through section A-A of FIG. 1 according to an embodiment of the present invention.

FIG. 4 is a cross section view through section A-A of FIG. 1 according to an 20 embodiment of the present invention. Isolation devices 402 and 404 are in contact with rear and front surfaces of hard disk drive 102, respectively. Isolation device 402 is also in contact with rear, inner surface 410 of frame 100. Isolation devices 410*a,b* are also in contact with front, inner surface 412 of frame 100. Two parallel isolation devices 410*a* and 410*b* are shown to facilitate the positioning of ribbon cable 414 from disk drive 102 to connector 104. However, a single isolation device 410 (not shown) could also be used, wherein cable 414 is routed between isolation device 302 or 304 and device 404.

Figure 5:
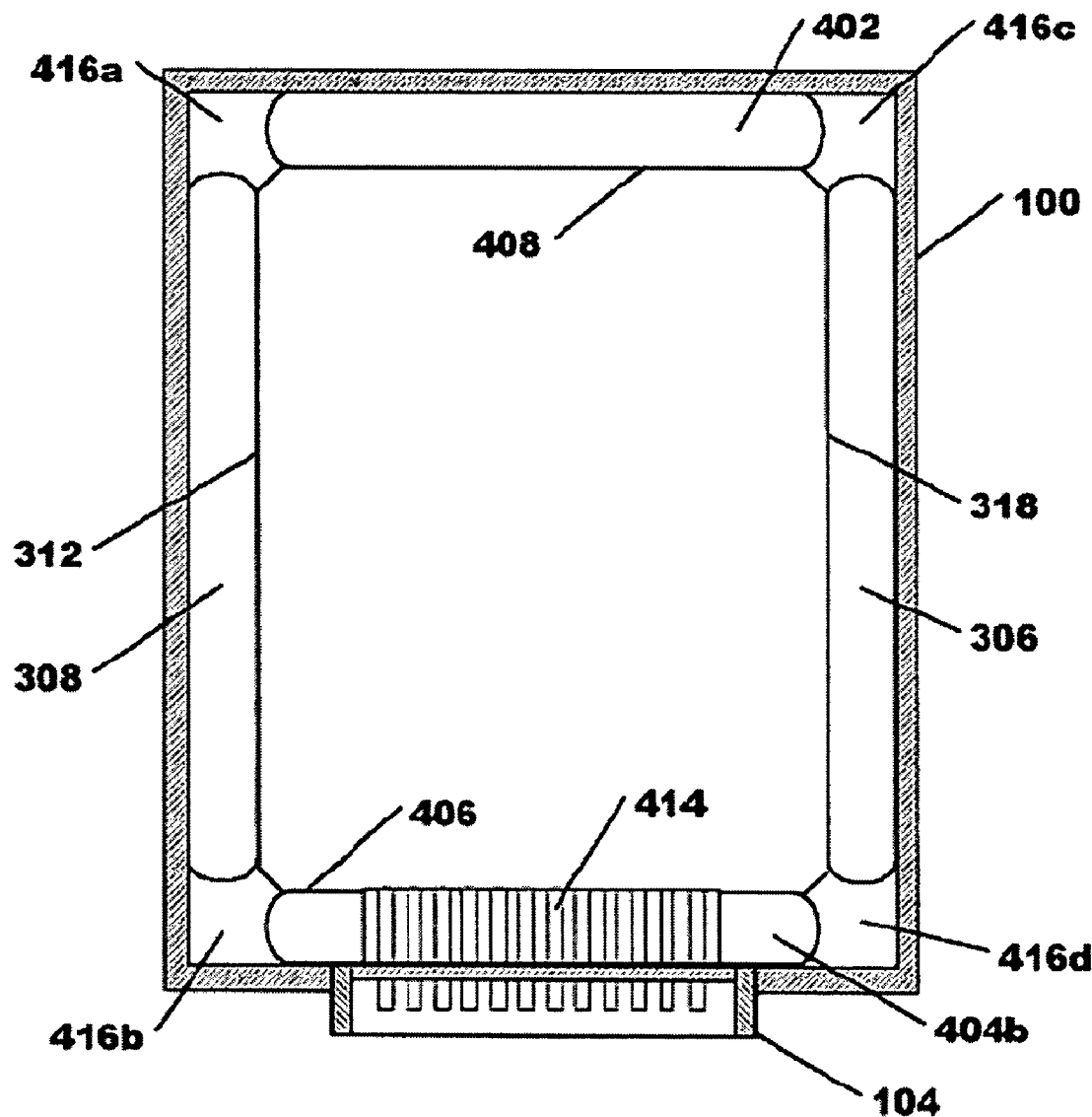
FIG. 5 is a cross section view through section C-C of FIG. 2 according to an embodiment of the present invention.

FIG. 5 is a cross section view through section C-C of FIG. 2 according to an 5 embodiment of the present invention. Isolation devices 306, 308, 402, and 404*b* extend approximately the full length or width of hard drive 102. Areas 416*a-d* may be provided to accommodate compression of liquid filled isolation devices, as described above.

Figure 6:
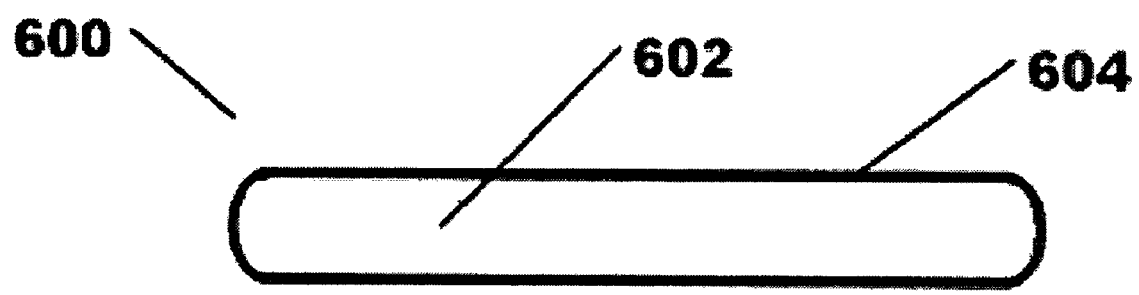
FIG. 6 is a cross section view of a fluid filled isolation device according to an embodiment of the present invention.

FIG. 6 is a cross section view of a fluid filled isolation device 600 according to an embodiment of the present invention. Isolation device 600 comprises a flexible membrane 604 that serves as containment for fluid 602, which can be a liquid or a gas. The flexible membrane 604 provides a "spring" component to the system. The fluid provides a damping component to the system. For gasses, an additional spring component is added due to compressibility. An advantage of the present invention is the tune-ability that this embodiment provides.

Fluid density and fluid viscosity have a substantial effect on the dynamic vibration and impact response of isolation device 600. Fluid density can be varied over about three orders of magnitude from gasses to liquids. Liquids having a density from about 0.5 g/cc to about 2 g/cc are preferable, using hydrocarbon, fluorocarbon or silicone fluids. Gasses having pressures from about 1 to 2 atm. (absolute) at 25° C. are also preferable. Viscosity can be varied over 6 orders of magnitude. Liquids having viscosities from about 0.5 centipoise to about 10,000 centipoise are suitable. Gasses having viscosities between 0.05 and 0.005 centipoise are also suitable.

The elasticity of the membrane and the pressure of the fluid inside the membrane also have an effect on the vibration and shock isolation characteristics of the isolation device 600. By varying film thickness and material composition of the film, the spring constant of the system can be varied. Flexible membrane 604 can be made from natural or synthetic rubbers, silicone rubber, and polyethylene. Preferably, the membrane 604 is made from polyethylene. The membrane thickness can vary from about 1 mil (0.001") to about 30 mils, and is preferably 2 to 10 mils for polyethylene films, although 1 mil thick membranes may also be used. Pressures of the fluid contained within the membrane are between about 1 to 2 atm. (absolute), preferably between about 1 and 1.2 atm. (absolute).

A further advantage of the present invention provides for the custom tuning of individual isolation devices or opposing device pairs to optimize shock or vibration response along different geometric dimensions or axes. For example, isolation devices 302 and 304 may contain fluids of different properties than devices 306, 308, 402, and 404*a,b* to compensate for the different contact areas. Additionally, individual isolation devices may be constructed of membranes of different thickness or elasticity for the same reason.

Figure 7:
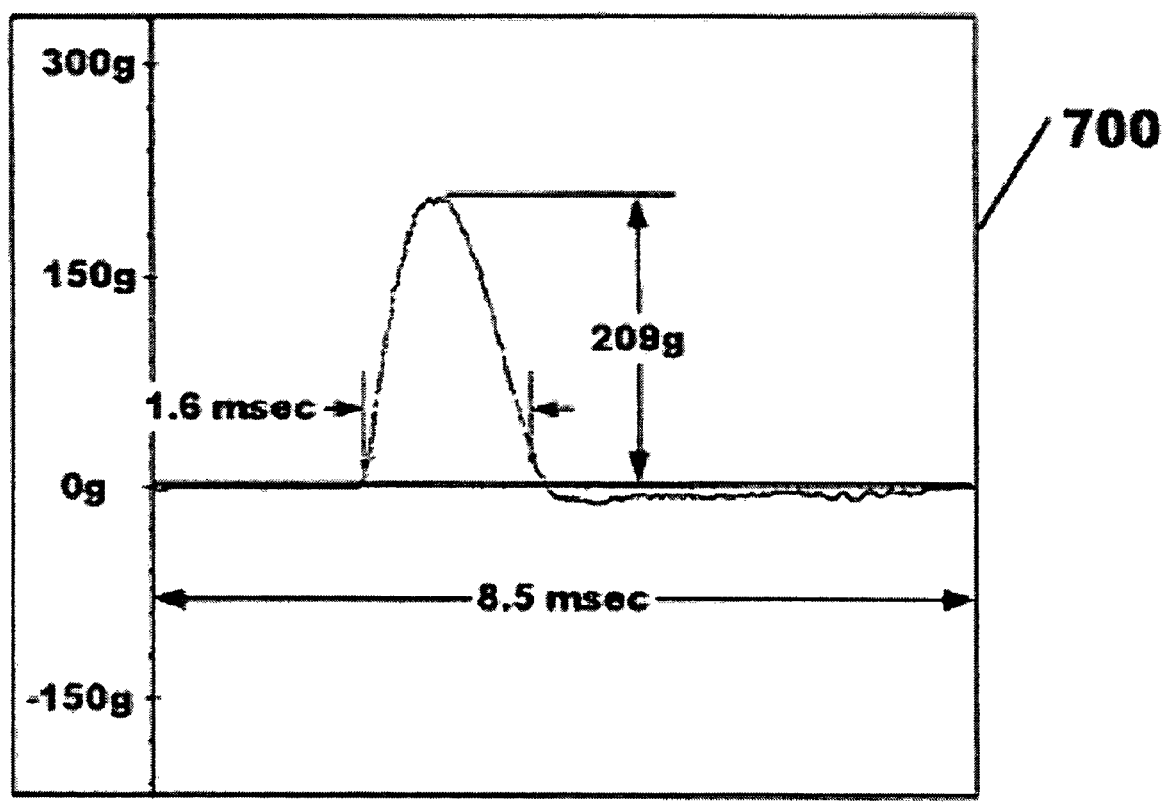
FIG. 7 is a graph of force versus time for a shock load applied to the external surface of frame according to an embodiment of the present invention.
Figure 8:
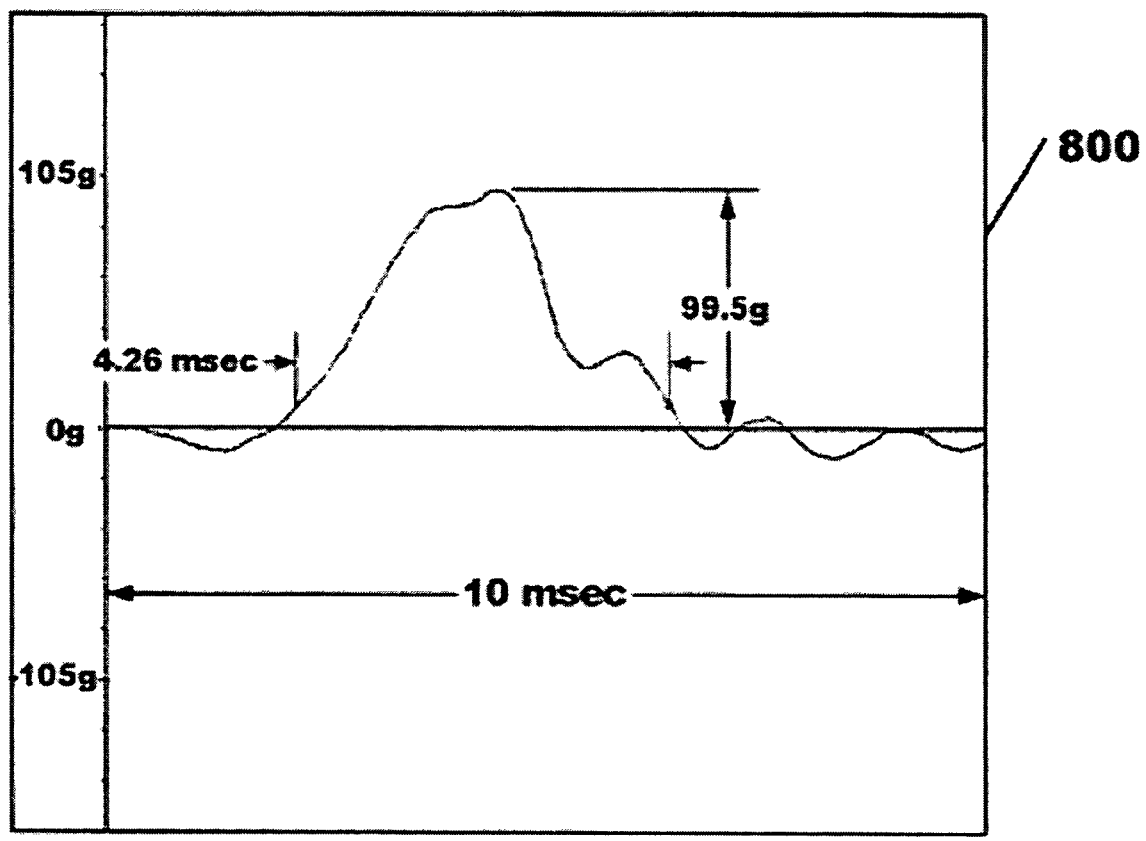
FIG. 8 is a graph of the resulting force transmitted to the hard disk drive suspended within the isolation structure according to an embodiment of the present invention.

For example, the damping response of the present invention to a shock load is shown in FIGS. 7 and 8. Six gas filled isolation devices were used, each containing air about 1 atm. (absolute), being constructed of polyethylene films of about 5 mils thick. FIG. 7 is a graph of force versus time for a shock load applied to the external surface of frame 100 according to an embodiment of the present invention. A shock force of 209$g$ (peak) over a time period of 1.6 msec was delivered to the frame containing the hard drive and shock isolation devices. FIG. 8 is a graph of the resulting force transmitted to the hard disk drive 102 suspended within the isolation structure according to an embodiment of the present invention. The shock force delivered to the hard drive has been reduced to 99.5 g (peak) over an extended time period of 4.26 msec.

Figure 9:
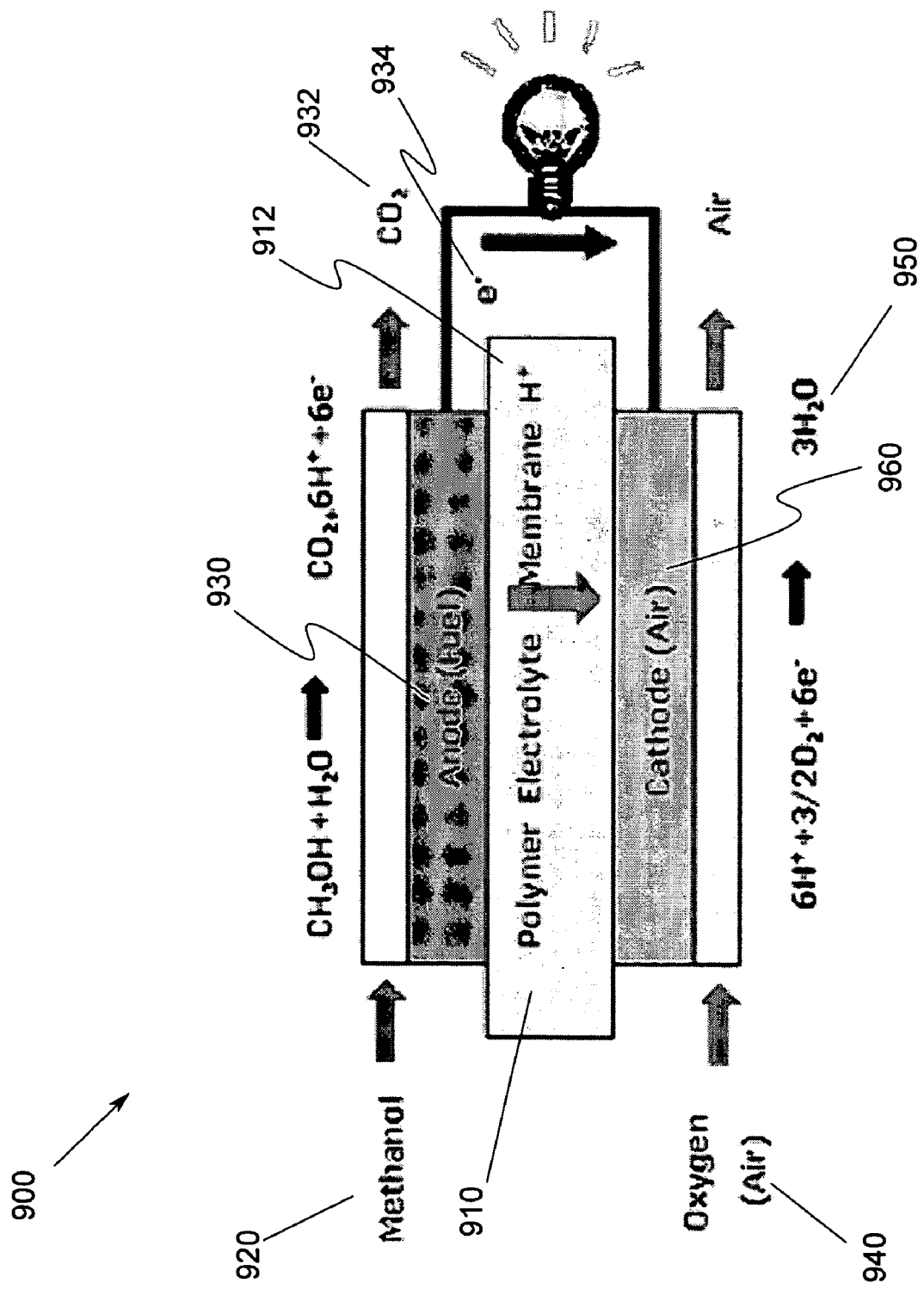
FIG. 9 shows the operation of a fuel cell for generating electrical charge and voltage to allow a disk drive or other electrical device to be independent of battery hookup according to an embodiment of the present invention.

FIG. 9 shows the operation of a fuel cell 900 for generating electrical charge and voltage to allow a disk drive or other electrical device to be independent of battery hookup according to an embodiment of the present invention. According to an embodiment of the present invention, the liquid membrane structure that surrounds the hard disk drive includes a fuel cell 900 that generates electrical charge and voltage that allows the device to be independent of battery hookup. The fuel cell 900 is an electrochemical energy conversion device that converts the chemicals hydrogen and oxygen into water, and in the process it produces electricity. With a fuel cell, chemicals constantly flow into the cell so it never goes dead—as long as there is a flow of chemicals into the cell, the electricity flows out of the cell. Most fuel cells in use today use hydrogen and oxygen as the chemicals.

There are several different types of fuel cells, each using a different chemistry. Fuel cells are usually classified by the type of electrolyte they use. Some types of fuel cells work well for use in stationary power generation plants. Others like the Direct Methanol Fuel Cells (DMFC) may be useful for small portable applications, such as the hard disk drive.

The technology behind DMFC is still in the early stages of development, but it has been successfully demonstrated powering mobile phones, laptop computers and hard disk drives. DMFC uses an electrolyte 910, which is a polymer, and the charge carrier is the hydrogen ion (proton) 912. However, the liquid methanol ($CH_3OH$) 920 is oxidized in the presence of water at the anode 930 generating $CO_2$ 932, hydrogen ions 912 and the electrons 934 that travel through the external circuit as the electric output of the fuel cell. The hydrogen ions travel through the electrolyte 910 and react with oxygen from the air 940 and the electrons from the external circuit to form water 950 at the cathode 960 completing the circuit. The reactions are as follows:

Anode Reaction: $CH_3OH+H_2O=>CO_2+6H++6e-$

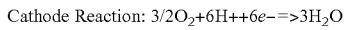
Cathode Reaction: $3/2O_2+6H++6e-=>3H_2O$

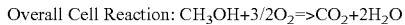
Overall Cell Reaction: $CH_3OH+3/2O_2=>CO_2+2H_2O$

Figure 10:
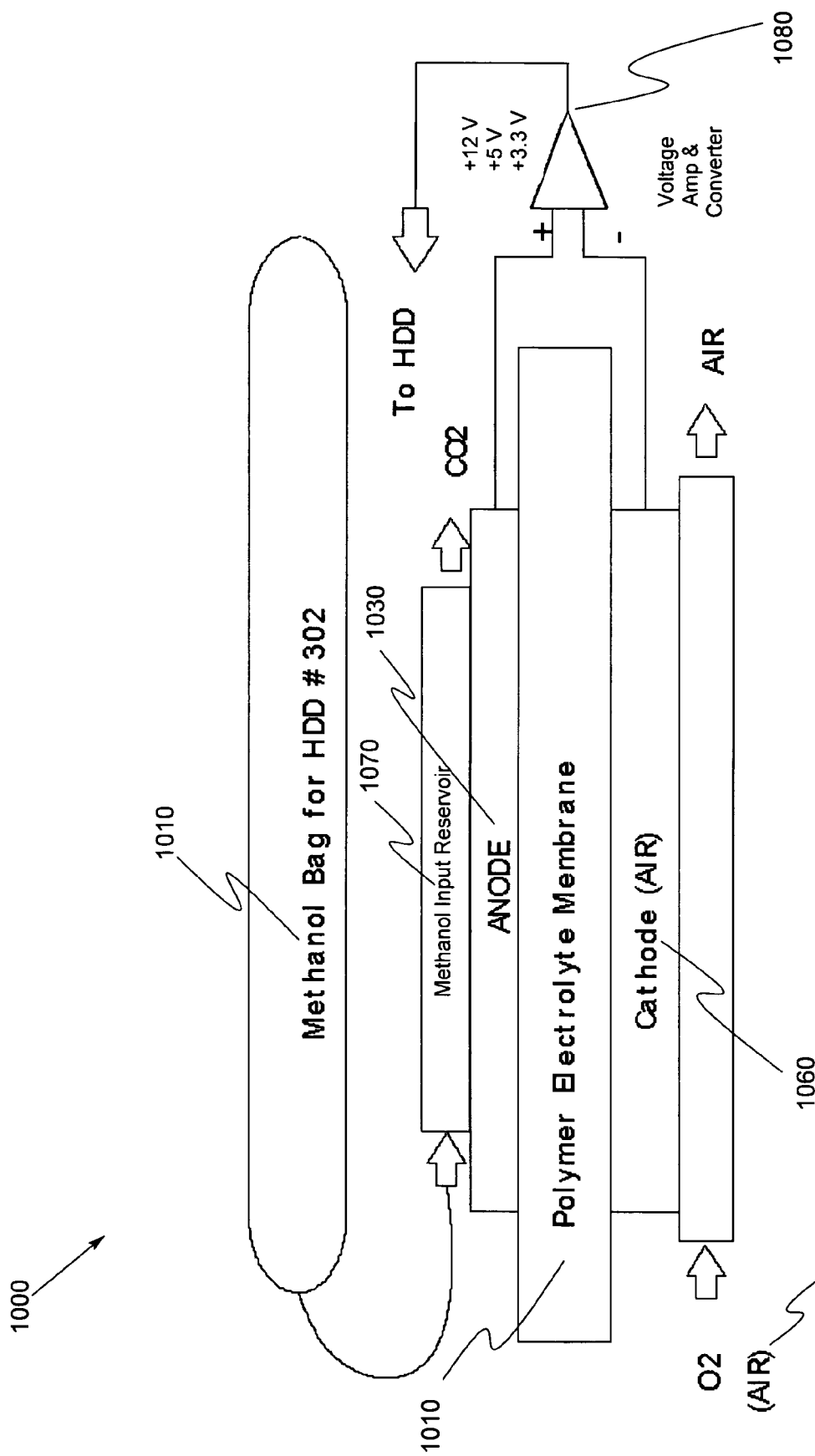
FIG. 10 shows a direct methanol fuel cell design for a disk drive or other electrical device according to an embodiment of the present invention.

FIG. 10 shows a direct methanol fuel cell design 1000 for a disk drive or other electrical device according to an embodiment of the present invention. In FIG. 10, the liquid is stored in the polyethlylene bags 1010 surrounding the hard disk drive because the methanol is toxic. DMFCs have increased power density 20-fold and the efficiency may eventually reach 40%. These cells have been tested in a temperature range from about 50° C.-120° C. This low operating temperature and no requirement for a fuel reformer make the DMFC an excellent candidate for very small to mid-sized applications, such as the hard disk drive.

As described above, the fuel cell, like an ordinary battery, provides dc electricity from two electrochemical reactions. These reactions occur at electrodes (or poles) to which reactants are continuously fed. The negative electrode (anode) 1030 is be maintained by supplying a fuel such as hydrogen or methanol from a reservoir 1070, whereas the positive electrode (cathode) 1060 is maintained by the supply of oxygen or air 1040.

In FIG. 10, the operating principles of fuel cell utilizing methanol as fuel, i.e., a Direct Methanol Fuel Cell (DMFC), according to an embodiment of the present invention are shown. When providing current, methanol is electrochemically oxidized at the anode 1030 electrocatalyst to produce electrons that travel through the external circuit 1080 to the cathode electrocatalyst where they are consumed together with oxygen 1040 in a reduction reaction. The circuit is maintained within the cell by the conduction of protons in the electrolyte.

In modern cells, electrolytes based on proton conducting polymer electrolyte membranes (e.g., Nafion™) are often used, since these allow for convenient cell design and for high temperature and pressure operation. The overall reaction occurring in the DMFC is the same as that for the direct combustion of methanol, i.e.:

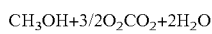
$CH_3OH+3/2O_2CO_2+2H_2O$

Only part of a fuel cell can store methanol; the cell must also accommodate a chemical engine, where hydrogen from the methanol combines with oxygen to generate electricity. To double the energy capacity of a standard battery, the battery must be made twice as massive. But with a fuel cell, the more methanol you can store, the longer it will provide power. That's why early fuel cells may look similar to today's batteries in size, but will weigh less.

Fuel cells need their own batteries. Most portable devices have varied power demands, requiring a large flow of electricity at certain times and a tiny trickle at others. Batteries handle this variety well, but fuel cells tend to produce a steady flow of electricity. To provide both a battery and a fuel cell the device can draw from the battery when demand is high, and run off the fuel cell when demand is lower. The fuel cell could be used to recharge the battery, depending on need. The battery is made tandem to the fuel cell. Alternatively, a device could use a rechargeable battery for short stretches of time to save the fuel cell under certain circumstances.

The system can be made with a polyethylene container 1070, which provides a 20 per cent solution of methanol that will provide sufficient fuel to power the disk drive for six to eight hours. The water produced by the electricity-generating chemical reaction is used to dilute the fuel down to the right concentration, 3-6 per cent, needed for the reaction to take place.

In an alternative embodiment of the present invention, the fuel cell is used only as a backup power supply to an on-board battery supply. This will be a hybrid technology in which the 2 power sources are used in tandem depending on the usage and current draw of the HDD.

Figure 11:
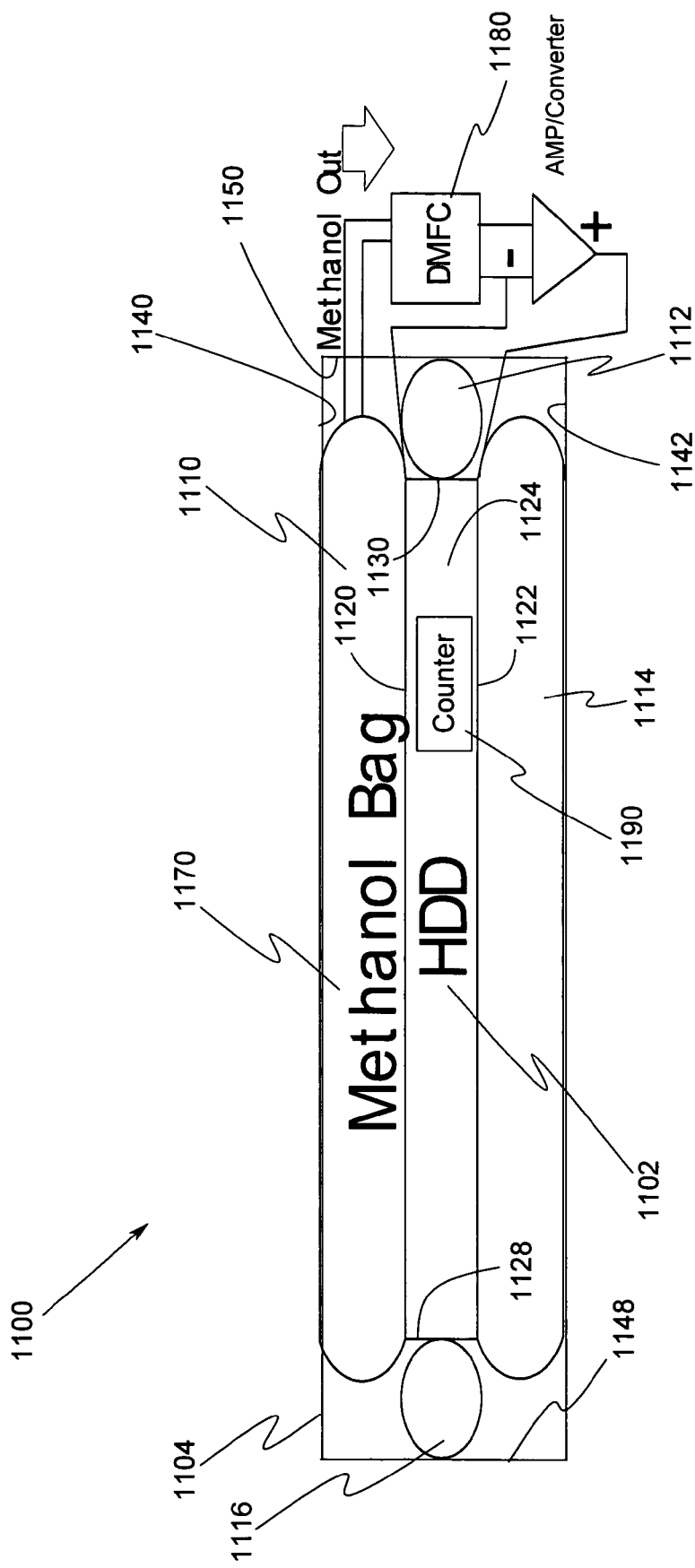
FIG. 11 shows a hard drive and fuel cell arrangement according to an embodiment of the present invention.

FIG. 11 shows a hard drive and fuel cell arrangement 1100 according to an embodiment of the present invention. A shock resistant information storage and retrieval device according to an embodiment of the present invention includes a hard disk drive is 1102, a frame enclosing the hard disk drive 1104, and a plurality of isolation devices 1110-1116 disposed between at least one inner surface of the frame 1104 and at least one opposing outer surface of the hard disk drive 1102, wherein the isolation devices 1110-1116 include a fluid contained within a flexible membrane. When the hard disk drive 1102 is vibrated or shocked the liquid or air filled membranes 1110-1116 return to their original shape after the shock event has passed. There is no need for manual intervention to redeploy the membranes 1110-1116 to their original shapes. Thus, a shockproof environment for the hard disk drive 1102 is provided, wherein the shape of the membranes 1110-1116 is not a function of time during the shock event. The shape of the membranes 1110-1116 will look the same before and after the shock or vibration event has transpired.

The hard disk drive 1102 includes a top surface 1120, a bottom surface 1122, a front surface 1124, a rear surface (obscured), a left surface 1128, and a right surface 1130. A frame 1104 enclosing the hard disk drive 1102 has a top inner surface 1140 opposing the top surface 1120, a bottom inner surface 1142 opposing the bottom surface 1122, a left inner surface 1148 opposing the left surface 1128, a right inner surface 1150 opposing the right surface 1130, a front inner surface (not shown) opposing the front surface 1124, and a rear inner surface opposing the rear surface.

A first isolation device 1110 is disposed between the top inner surface 1140 and the top surface 1120, wherein the first isolation device 1110 comprises a first fluid contained within a first flexible membrane. A second isolation device 1114 is disposed between the bottom inner surface 1142 and the bottom surface 1122, wherein the second isolation device 1112 comprises a second fluid contained within a second flexible membrane 1112. A third isolation device 1116 is disposed between the left inner surface 1148 and the left surface 1128, wherein the third isolation device 1116 comprises a third fluid contained within a third flexible membrane 1116. A fourth isolation device 1112 is disposed between the right inner surface 1150 and right surface 1130, wherein the fourth isolation device 1112 comprises a fourth fluid contained within a fourth flexible membrane 1112. A fifth isolation device (not shown) is disposed between the front inner surface and the front surface, wherein the fifth isolation device comprises a fifth fluid contained within a fifth flexible membrane, and a sixth isolation device (not shown) is disposed between the rear inner surface and the rear surface, wherein the sixth isolation device comprises a sixth fluid contained within a sixth flexible membrane. Methanol 1170 is stored as a liquid in the polyethlylene bags surrounding the hard disk drive because the methanol is toxic.

A direct methanol fuel cell 1180 according to an embodiment of the present invention may be configured to provide an output of 100 milliwatts when the fuel cell is approximately 5.5 cc. Such a fuel cell will have a weight of approximately 8.5 grams including 2 cc of methanol fuel inside the tank. These calculations assume that the fuel is Methanol having 99.5% concentration.

The direct methanol fuel cell 1180 according to an embodiment of the present invention is capable of being scaled to provide more power. For example, the direct methanol fuel cell 1180 may be scaled-up for powering the hard disk drive at 1 Watt. A direct methanol fuel cell 1180 that is capable of providing 1 Watt of power would have a volume of approximately 55 cc. Such a fuel cell will have a weight of approximately 45 grams including 20 cc of methanol fuel inside the tank.

Still further, the direct methanol fuel cell 1180 according to an embodiment of the present invention is capable of being scaled to provide 2 Watts. A direct methanol fuel cell 1180 that is capable of providing 2 Watts of power would have a volume of approximately 110 cc. Such a fuel cell will have a weight of approximately 90 grams including 40 cc of methanol fuel inside the tank.

In addition, when the methanol source 1170 in the shock bag 1110 is be depleted, the bag will need to be replenished by the user depending on the power usage. The disk drive 1102 may be configured to determine when the bag 1110 is at 50% depletion by using a counter 1190 that tracks the amount of current the drive is using. The current is directly proportional to the methanol flow into the fuel cell 1180. In this manner, the hard disk drive 1102 may instruct the user through the communication channel or link that the bag is at 50% volume capacity and would need to be replenished to the 100% level.

Table 1 below shows the power and time of a direct methanol fuel cell 1180 according to an embodiment of the present invention. In Table 1, a tank of 40 cc of methanol would provide 2000 milliwatts of power for 20 hours.

TABLE 1

| DMFC Tank Vol (cc) | 2000 mW Time (hrs) |
|---|---|
| 40 | 20 |

Table 2 shows the peak power, read/write power, idle power and standby power for a 2.5-inch mobile drive until the methanol bag is depleted. For a peak power of 2000 milliwatts, the direct methanol fuel cell 1180 according to an embodiment of the present invention would provide 200 hours or 8 days of power. The duration for the direct methanol fuel cell 1180 would increase as the power requirements decrease as shown in Table 2.

TABLE 2

| PeakPower 2000 mW Time (hrs) | R/W Power 1800 mW Time (hrs) | Idle Power 800 mW Time (hrs) | Standby 260 mW Time (hrs) |
|---|---|---|---|
| 200 | 223 | 499 | 1535 |
| Time (days) | Time (days) | Time (days) | Time (days) |
| 8 | 9 | 21 | 64 |

Table 3 shows the power consumption of a typical server, mobile drive and microdrive in watts for seek, read/write, idle and standby. A server hard disk drive typically does not have a standby mode.

TABLE 3

| Type | Seek | R/W | Idle | Standby |
|---|---|---|---|---|
| Server | 18 | 12 | 11 | n/a |
| Mobile | 2 | 1.8 | 0.8 | 0.26 |
| MicroDrive | 1 | 0.6 | 0.4 | 0.15 |

Figure 12:
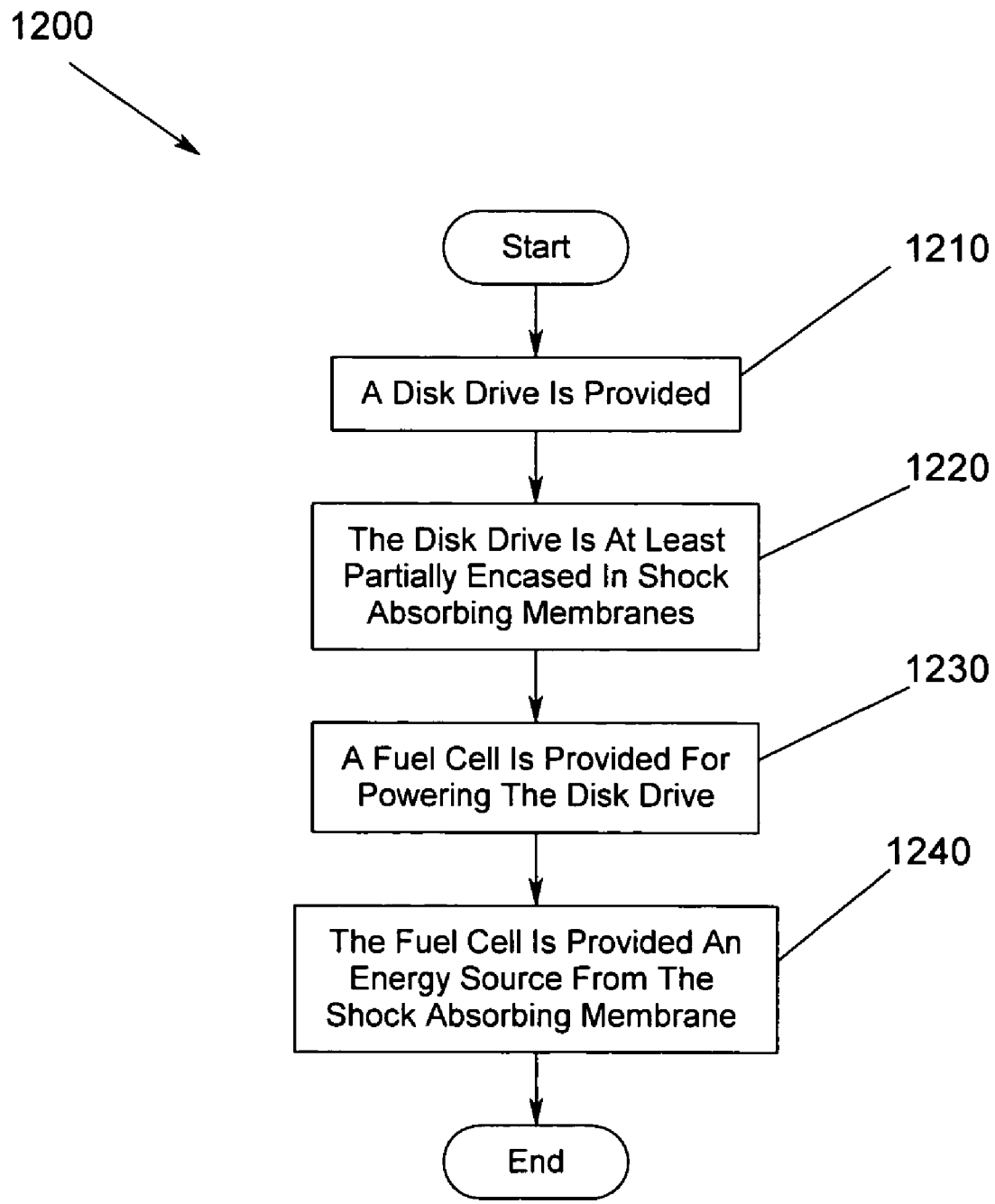
FIG. 12 is a flow chart of a method for providing an electronic device with a fuel cell according to an embodiment of the present invention.

FIG. 12 is a flow chart 1200 of a method for providing an electronic device with a fuel cell according to an embodiment of the present invention. In FIG. 12, a disk drive is provided 1210. The disk drive is at least partially encased in shock absorbing membranes 1220. A fuel cell is provided for powering the disk drive 1230. The fuel cell is provided an energy source from the shock absorbing membrane 1240. As described in detail above with reference to FIGS. 9-11, the fuel cell may be a direct methanol fuel cell 1180 and the fuel cell may be provided methanol as a fuel source from a shock absorbing membrane filled with methanol.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A shock resistant information storage and retrieval device comprising:
   a hard disk drive;
   a frame enclosing said hard disk drive;

a plurality of isolation devices disposed between at least one inner surface of said frame and at least one opposing outer surface of said hard disk drive, and a fuel cell, coupled to the hard disk drive and at least one of the plurality of isolation devices;

wherein said plurality of isolation devices comprise a fluid contained within a flexible membrane to provide shock absorption to the disk drive within the frame and to provide fuel for powering the fuel cell.

2. The device as recited in claim 1, wherein said fluid comprises methanol.

3. The device as recited in claim 1, wherein the fuel cell includes a reservoir for receiving fluid from at least one of the plurality of isolation devices.

4. The device as recited in claim 1, wherein the fuel cell comprises a direct methanol fuel cell.

5. The device as recited in claim 4, wherein the direct methanol fuel cell comprises an anode, a cathode, an electrolyte and a reservoir for receiving methanol from at least one of the plurality of isolation devices.

6. The device as recited in claim 5, wherein the fuel cell electrochemically oxidizes methanol at the anode to produce electrons for providing power to the disk drive.

7. The device as recited in claim 6, wherein the fuel cell further produces hydrogen at the anode, the hydrogen being provided to the electrolyte for the conduction of protons in the electrolyte.

8. The device as recited in claim 7, wherein the cathode produces water using hydrogen conducting through the electrolyte and oxygen.

9. The device as recited in claim 8, wherein the oxygen is provided at the cathode via a flow or air.

10. The device as recited in claim 5, wherein the electrolyte comprises a proton conducting polymer electrolyte membrane.

11. The device as recited in claim 1 further comprising a battery for providing power when demand is high.

12. The device as recited in claim 11, wherein the fuel cell recharges the battery.

13. The device as recited in claim 1 further comprising a counter for determining a level of depletion for the fuel cell.

14. The device as recited in claim 13, wherein the counter determines a level of depletion for the fuel cell based upon a measurement of an amount of current being produced by the fuel cell.

15. The device as recited in claim 1, wherein at least one of the plurality of isolation devices provides methanol to the fuel cell and wherein the at least one of the plurality of isolation devices providing methanol is replenishable.

16. The device as recited in claim 1, wherein the plurality of isolation devices comprises membranes filled with fluids and membranes filled with gases, wherein the membranes are stacked in alternating sequence of fluids and gases.

17. The device as recited in claim 1, wherein the fluid comprises a hydrocarbon fluid.

18. A shock absorbing power device, comprising:
a plurality of isolation devices; and
a fuel cell, coupled to at least one of the plurality of isolation devices;
wherein said plurality of isolation devices comprise a fluid contained within a flexible membrane to provide shock absorption and to provide fuel for powering the fuel cell.

19. The shock absorbing power device as recited in claim 18, wherein the fuel cell includes a reservoir for receiving fluid from at least one of the plurality of isolation devices, the fluid comprising methanol.

20. A method for providing a fluid damping structure with fuel cell, comprising:
providing a disk drive;
at least partially encasing the disk drive between shock absorbing membranes providing fuel cell for powering the disk drive; and
supplying the fuel cell with an energy source stored in the shock absorbing membranes.

* * * * *